United States Patent
Alexander et al.

(10) Patent No.: US 9,940,264 B2
(45) Date of Patent: *Apr. 10, 2018

(54) LOAD AND STORE ORDERING FOR A STRONGLY ORDERED SIMULTANEOUS MULTITHREADING CORE

(71) Applicant: International Business Machines Corporation, Armonk, NY (US)

(72) Inventors: Khary J. Alexander, Poughkeepsie, NY (US); Jonathan T. Hsieh, Poughkeepsie, NY (US); Christian Jacobi, Poughkeepsie, NY (US); Martin Recktenwald, Schoenaich (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 124 days.

This patent is subject to a terminal disclaimer.

(21) Appl. No.: 14/511,408

(22) Filed: Oct. 10, 2014

(65) Prior Publication Data

US 2016/0103681 A1    Apr. 14, 2016

(51) Int. Cl.
*G06F 12/12* (2016.01)
*G06F 12/08* (2016.01)
(Continued)

(52) U.S. Cl.
CPC .......... *G06F 12/128* (2013.01); *G06F 9/3834* (2013.01); *G06F 9/3851* (2013.01);
(Continued)

(58) Field of Classification Search
None
See application file for complete search history.

(56) References Cited

U.S. PATENT DOCUMENTS 5,475,823 A * 12/1995 Amerson ............... G06F 9/3834
                                                     711/169
5,606,670 A *  2/1997 Abramson ............ G06F 9/3834
                                                     711/154

(Continued)

OTHER PUBLICATIONS

C Q&A #1: How many bits are there in a byte? by Phoxis, published Jun. 2012 at http://phoxis.org/2012/06/17/c-qa-1-how-many-bits-are-there-in-a-byte/.*

(Continued)

*Primary Examiner* — Reginald Bragdon
*Assistant Examiner* — Paul Knight
(74) *Attorney, Agent, or Firm* — Cantor Colburn LLP; William A. Kinnaman, Jr.

(57) ABSTRACT

A mechanism for simultaneous multithreading is provided. Responsive to performing a store instruction for a given thread of threads on a processor core and responsive to the core having ownership of a cache line in a cache, an entry of the store instruction is placed in a given store queue belonging to the given thread. The entry for the store instruction has a starting memory address and an ending memory address on the cache line. The starting memory addresses through ending memory addresses of load queues of the threads are compared on a byte-per-byte basis against the starting through ending memory address of the store instruction. Responsive to one memory address byte in the starting through ending memory addresses in the load queues overlapping with a memory address byte in the starting through ending memory address of the store instruction, the threads having the one memory address byte is flushed.

12 Claims, 8 Drawing Sheets

(51) Int. Cl.
*G06F 9/38* (2006.01)
*G06F 9/52* (2006.01)
*G06F 12/128* (2016.01)
*G06F 12/0875* (2016.01)
*G06F 12/084* (2016.01)
*G06F 12/0811* (2016.01)

(52) U.S. Cl.
CPC .............. *G06F 9/52* (2013.01); *G06F 12/084* (2013.01); *G06F 12/0811* (2013.01); *G06F 12/0875* (2013.01); *G06F 2212/1016* (2013.01); *G06F 2212/452* (2013.01); *G06F 2212/62* (2013.01)

(56) References Cited

U.S. PATENT DOCUMENTS

| | | | |
|---|---|---|---|
| 5,742,831 A | 4/1998 | Creta | |
| 5,802,588 A * | 9/1998 | Ramagopal | G06F 9/3824 711/118 |
| 5,832,297 A * | 11/1998 | Ramagopal | G06F 9/30047 710/5 |
| 6,021,485 A * | 2/2000 | Feiste | G06F 9/3816 712/216 |
| 6,216,200 B1 * | 4/2001 | Yeager | G06F 9/3834 711/100 |
| 6,266,768 B1 * | 7/2001 | Frederick, Jr. | G06F 9/3834 712/205 |
| 6,553,473 B1 | 4/2003 | Gaskins et al. | |
| 6,651,158 B2 * | 11/2003 | Burns | G06F 9/4881 712/205 |
| 6,931,639 B1 * | 8/2005 | Eickemeyer | G06F 9/3802 712/228 |
| 7,302,527 B2 | 11/2007 | Barrick et al. | |
| 7,752,393 B2 | 7/2010 | Cox et al. | |
| 7,873,785 B2 | 1/2011 | Olukotun | |
| 8,537,832 B2 | 9/2013 | Pirog et al. | |
| 2002/0010836 A1 * | 1/2002 | Barroso | G06F 12/0811 711/122 |
| 2004/0216105 A1 * | 10/2004 | Burky | G06F 9/3851 718/100 |
| 2005/0114856 A1 * | 5/2005 | Eickemeyer | G06F 9/4843 718/100 |
| 2005/0177689 A1 * | 8/2005 | Leijten | G06F 13/161 711/149 |
| 2006/0174083 A1 * | 8/2006 | Barrick | G06F 9/383 711/169 |
| 2007/0288725 A1 | 12/2007 | Luick | |
| 2007/0288727 A1 * | 12/2007 | Altman | G06F 9/383 712/225 |
| 2008/0022283 A1 * | 1/2008 | Krieger | G06F 9/3851 718/104 |
| 2009/0037697 A1 * | 2/2009 | Ramani | G06F 9/3834 712/214 |
| 2010/0235586 A1 | 9/2010 | Gonion | |
| 2011/0093687 A1 * | 4/2011 | Chen | G06F 12/0862 712/225 |
| 2011/0154116 A1 * | 6/2011 | Alexander | G06F 9/3834 714/37 |
| 2011/0258421 A1 * | 10/2011 | Elnozahy | G06F 11/3636 712/227 |
| 2012/0221793 A1 * | 8/2012 | Tran | G06F 12/0811 711/122 |
| 2013/0212585 A1 * | 8/2013 | Tran | G06F 9/30189 718/102 |
| 2013/0254488 A1 | 9/2013 | Kaxiras et al. | |
| 2014/0047205 A1 | 2/2014 | Frey et al. | |
| 2015/0100965 A1 * | 4/2015 | Tran | G06F 9/5011 718/103 |

OTHER PUBLICATIONS

Reducing Design Complexity of the Load/Store Queue by Park; IEEE 2003.*
Performance Evaluation and Benchmarking by Kurian; Taylor and Francis 2006.*
Using Virtual Load/Store Queues (VLSQs) to Reduce the Negative Effects of Reordered Memory Instructions by Jaleel and Jacob; IEEE 2005.*
MASA: A Multithreaded Processor Architecture for Parallel Symbolic Computing by Halstead; IEEE 2008.*
AMD64 Architecture Prorammer's Manual vol. 2: System Programming; May 2013.*
Memory Systems; Jacob; Morgan Kaufman 2007.*
Computer Architecure: A Quantitative Approach: Hennessy and Patterson; $4^{th}$ Edition 2007 pp. 71-72 and 102-104.*
SMT—Directory: Efficient Load-Load Ordering for SMT by Hilton; University of Pennsylvania 2010.*
Minimal Multi-Threading: Finding and Removing Redundant Instructions in Multi-Threaded Processors by Long; IEEE 2010.*
Energy Efficient Speculative Threads: Dynamic Thread Allocation in Same—ISA Heterogeneous Multicore Systems by Luo; ACM 2010.*
Characterizing the Resource-Sharing Levels in the UltraSPARC T2 Processor by Cakarevic ACM 2009.*
Khary J. Alexander, et al., "Load and Store Ordering for a Strongly Ordered Simultaneous Multithreading Core," U.S. Appl. No. 14/828,632, filed Aug. 18, 2015.
List of IBM Patents or Patent Applications Treated as Related; Date Filed: Oct. 10, 2014; pp. 1-2.
C. Jacobi, et al., "Transactional Memory Architecture and Implementation for IBM System Z," Microarchitecture (MICRO). 2012 45th Annual IEEE/ACM International Symposium on IEEE, 2012. pp. 1-12.
P. Mak, et al., "IBM System z10 Procession Cache Subsystem Microarchitecture," IBM J. Res. & Dev. vol. 53, No. 1 Paper 2 2009; pp. 1-12.

* cited by examiner

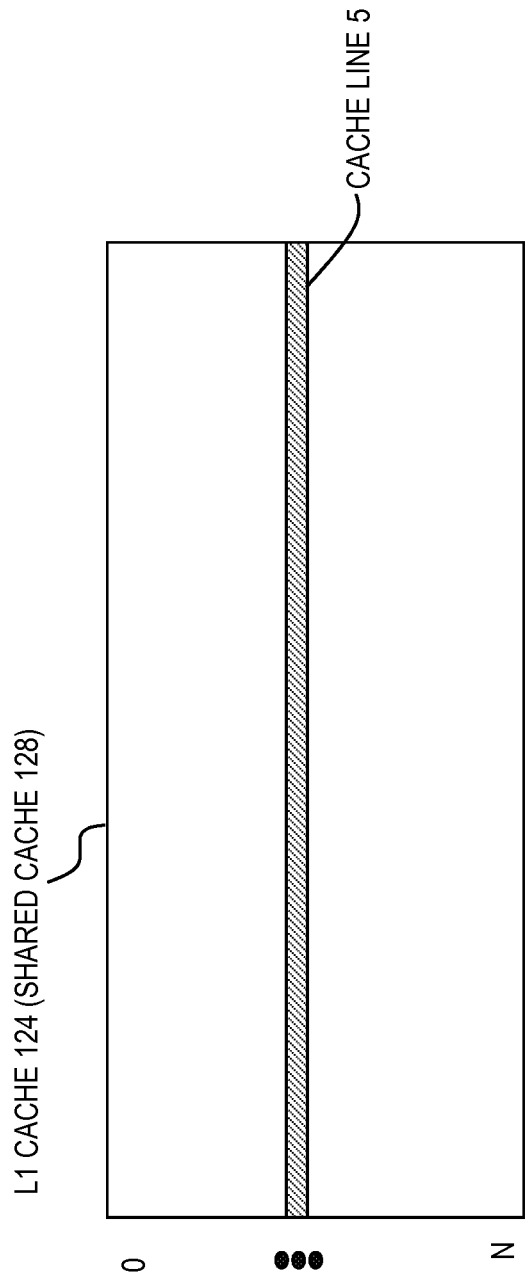

FIG. 1C

LOAD QUEUE 20A (THREAD 10A)

| SEQUENTIAL TAG | START MEMORY ADDRESS | ENDING MEMORY ADDRESS |
|---|---|---|
| 04 | BYTE 16 | BYTE 23 |

STORE QUEUE 25A

| SEQUENTIAL TAG | START MEMORY ADDRESS | ENDING MEMORY ADDRESS |
|---|---|---|
| 01 | BYTE 0 | BYTE 7 |

LOAD QUEUE 20B (THREAD 10B)

| SEQUENTIAL TAG | START MEMORY ADDRESS | ENDING MEMORY ADDRESS |
|---|---|---|
| 02 | BYTE 0 | BYTE 7 |

STORE QUEUE 25B

| SEQUENTIAL TAG | START MEMORY ADDRESS | ENDING MEMORY ADDRESS |
|---|---|---|
| 05 | BYTE 16 | BYTE 23 |

LOAD QUEUE 20C (THREAD 10C)

| SEQUENTIAL TAG | START MEMORY ADDRESS | ENDING MEMORY ADDRESS |
|---|---|---|
| 03 | BYTE 24 | BYTE 33 |

STORE QUEUE 25C

| SEQUENTIAL TAG | START MEMORY ADDRESS | ENDING MEMORY ADDRESS |
|---|---|---|
| 06 | BYTE 0 | BYTE 7 |

FIG. 1D

LOAD QUEUE 20A

| SEQUENTIAL TAG | START MEMORY ADDRESS | ENDING MEMORY ADDRESS |
|---|---|---|
| 04 | BYTE 16 | BYTE 23 |

THREAD 10A

STORE QUEUE 25A

| SEQUENTIAL TAG | START MEMORY ADDRESS | ENDING MEMORY ADDRESS |
|---|---|---|
| 14 | BYTE 0 | BYTE 7 |

LOAD QUEUE 20B

| SEQUENTIAL TAG | START MEMORY ADDRESS | ENDING MEMORY ADDRESS |
|---|---|---|
| 02 | BYTE 0 | BYTE 7 |

THREAD 10B

STORE QUEUE 25B

| SEQUENTIAL TAG | START MEMORY ADDRESS | ENDING MEMORY ADDRESS |
|---|---|---|
| 15 | BYTE 16 | BYTE 23 |

LOAD QUEUE 20C

| SEQUENTIAL TAG | START MEMORY ADDRESS | ENDING MEMORY ADDRESS |
|---|---|---|
| 13 | BYTE 24 | BYTE 33 |

THREAD 10C

STORE QUEUE 25C

| SEQUENTIAL TAG | START MEMORY ADDRESS | ENDING MEMORY ADDRESS |
|---|---|---|
| 06 | BYTE 0 | BYTE 7 |

IN RESPONSE TO PERFORMING A STORE INSTRUCTION FOR A GIVEN THREAD OF THE THREADS ON THE PROCESSOR CORE AND IN RESPONSE TO THE PROCESSOR CORE HAVING OWNERSHIP OF A CACHE LINE IN THE CACHE, THE PROCESSOR CORE IS CONFIGURED TO EXECUTE THE STORE INSTRUCTION  305

PLACE AN ENTRY OF THE STORE INSTRUCTION IN A GIVEN STORE QUEUE BELONGING TO THE GIVEN THREAD, THE ENTRY FOR THE STORE INSTRUCTION HAVING A STARTING MEMORY ADDRESS AND AN ENDING MEMORY ADDRESS ON THE CACHE LINE 310

COMPARE STARTING MEMORY ADDRESSES THROUGH ENDING MEMORY ADDRESSES OF THE LOAD QUEUES OF THE THREADS ON A BYTE-PER-BYTE BASIS AGAINST THE STARTING MEMORY ADDRESS THROUGH THE ENDING MEMORY ADDRESS OF THE STORE INSTRUCTION 315

IN RESPONSE TO AT LEAST ONE MEMORY ADDRESS BYTE IN THE STARTING THROUGH ENDING MEMORY ADDRESSES IN THE LOAD QUEUES OF THE THREADS OVERLAPPING WITH A MEMORY ADDRESS BYTE IN THE STARTING THROUGH ENDING MEMORY ADDRESS OF THE STORE INSTRUCTION, FLUSH ONE OR MORE OF THE THREADS HAVING THE AT LEAST ONE MEMORY ADDRESS BYTE 320

IN RESPONSE TO NO OVERLAP, ALLOWING ENTRIES IN THE LOAD QUEUES OF THE FIRST THREADS TO REMAIN 325

FIG. 4

IN RESPONSE TO PERFORMING A LOAD INSTRUCTION FOR A GIVEN THREAD OF THE THREADS ON THE PROCESSOR CORE AND IN RESPONSE TO THE PROCESSOR CORE HAVING OWNERSHIP OF A CACHE LINE IN THE CACHE, THE PROCESSOR CORE IS CONFIGURED TO EXECUTE THE LOAD INSTRUCTION  405

PLACE AN ENTRY OF THE LOAD INSTRUCTION IN A GIVEN LOAD QUEUE BELONGING TO THE GIVEN THREAD, THE ENTRY FOR THE LOAD INSTRUCTION HAVING A STARTING MEMORY ADDRESS AND AN ENDING MEMORY ADDRESS ON THE CACHE LINE 410

COMPARE STARTING MEMORY ADDRESSES THROUGH ENDING MEMORY ADDRESSES OF THE STORE QUEUES OF THE THREADS ON A BYTE-PER-BYTE BASIS AGAINST THE STARTING MEMORY ADDRESS THROUGH THE ENDING MEMORY ADDRESS OF THE LOAD INSTRUCTION 415

IN RESPONSE TO AT LEAST ONE MEMORY ADDRESS BYTE IN THE STARTING THROUGH ENDING MEMORY ADDRESSES IN THE STORE QUEUES OF THE THREADS OVERLAPPING WITH A MEMORY ADDRESS BYTE IN THE STARTING THROUGH ENDING MEMORY ADDRESS OF THE LOAD INSTRUCTION, REJECT THE LOAD INSTRUCTION AND REPEAT THE LOAD INSTRUCTION LATER 420

IN RESPONSE TO NO OVERLAP, ALLOWING THE LOAD INSTRUCTION TO PROCESS 425

LOAD AND STORE ORDERING FOR A STRONGLY ORDERED SIMULTANEOUS MULTITHREADING CORE

BACKGROUND

The present disclosure relates generally to processor cores, and more specifically, to simultaneous multithreading (SMT) on the processor cores.

Simultaneous multithreading allows various core resources of a processor to be shared by a plurality of instruction streams known as threads. Core resources can include instruction-execution units, caches, translation-lookaside buffers (TLBs), and the like, which may be collectively referred to generally as a core. A single thread, whose instructions access data, typically cannot utilize the full core resource due to the latency to resolve data located in the memory nest. Multiple threads accessing data sharing a core resource typically result in a higher core utilization and core instruction throughput, but individual threads may experience slower execution. In a super-scalar processor simultaneous multithreading (SMT) implementation, multiple threads may be simultaneously serviced by the core resources of one or more cores.

SUMMARY

According to an embodiment, a system for simultaneous multithreading (SMT) is provided. The system includes a cache and a processor core having circuitry to execute threads by SMT, where each of the threads has its own load queue and store queue. In response to performing a store instruction for a given thread of the threads on the processor core and in response to the processor core having ownership of a cache line in the cache, the processor core is configured to execute the store instruction including placing an entry of the store instruction in a given store queue belonging to the given thread, where the entry for the store instruction having a starting memory address and an ending memory address on the cache line. The processor core compares starting memory addresses through ending memory addresses of load queues of the threads on a byte-per-byte basis against the starting memory address through the ending memory address of the store instruction. The processor core in response to at least one memory address byte in the starting through ending memory addresses in the load queues of the threads overlapping with a memory address byte in the starting through ending memory address of the store instruction, flushes one or more of the threads having the at least one memory address byte. The processor core in response to no overlap, allowing entries in the load queues of the threads to remain.

According to an embodiment, a system for SMT is provided. The system includes a cache and a processor core having circuitry to execute threads by SMT, where each of the threads has its own load queue and store queue. In response to performing a load instruction for a given thread of the threads on the processor core and in response to the processor core having ownership of a cache line in the cache, the processor core is configured to execute the load instruction including placing an entry of the load instruction in a given load queue belonging to the given thread, where the entry for the load instruction has a starting memory address and an ending memory address on the cache line. The processor is configured to compare starting memory addresses through ending memory addresses of store queues of the threads on a byte-per-byte basis against the starting memory address through the ending memory address of the load instruction. In response to at least one memory address byte in the starting through ending memory addresses in the store queues of the threads overlapping with a memory address byte in the starting through ending memory address of the load instruction, the processor is configured to reject the load instruction and subsequently repeat the load instruction. In response to no overlap, the processor is configured to allow the load instruction to process.

According to an embodiment, a method for SMT is provided. The method includes in response to performing a store instruction for a given thread of threads on a processor core and in response to the processor core having ownership of a cache line in a cache, placing an entry of the store instruction in a given store queue belonging to the given thread, where the entry for the store instruction has a starting memory address and an ending memory address on the cache line. The processor core compares starting memory addresses through ending memory addresses of load queues of the threads on a byte-per-byte basis against the starting memory address through the ending memory address of the store instruction. In response to at least one memory address byte in the starting through ending memory addresses in the load queues of the threads overlapping with a memory address byte in the starting through ending memory address of the store instruction, the processor core flushes one or more of the threads having the at least one memory address byte. In response to no overlap, the processor core allows entries in the load queues of the threads to remain.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 1B depicts a cache with cache lines in accordance with an embodiment;

FIG. 1C depicts entries in load queues and store queues in accordance with an embodiment;

FIG. 1D depicts entries in load queues and store queues in accordance with an embodiment;

FIG. 3 depicts a flow chart for simultaneously processing store instructions of threads in a single processor core in accordance with an embodiment;

FIG. 4 depicts a flow chart for simultaneously processing load instructions of threads in a single processor core in accordance with an embodiment.

DETAILED DESCRIPTION

Figure 1A:
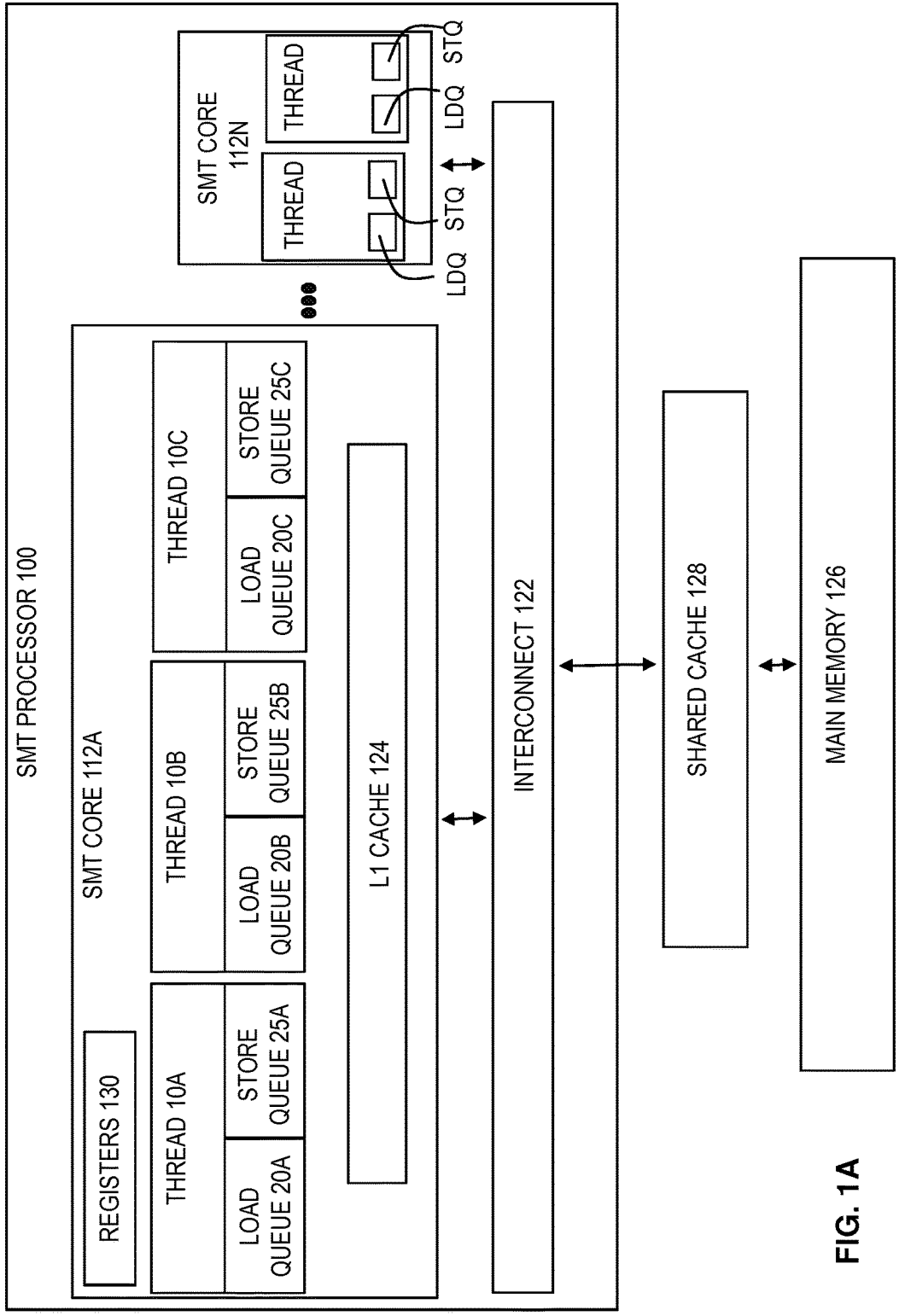
FIG. 1A depicts an example of an SMT multicore environment in accordance with an embodiment.

Embodiments described herein can be utilized to track exclusivity of a cache line for an entire core and allow multiple threads within a core to access the cache line concurrently. Embodiments employ load queue compares for each executed store instruction. The load queue compares are when the address of the store instruction is compared against the addresses of the load queue entries of other threads to detect byte-precise overlaps and detect potential multiprocessor (MP) coherency violations. The pipeline is flushed when overlap is found. Embodiments employ store queue compares for each executed load instruction. The store queue compares are when the address of the load instruction is compared against the addresses of the store queue entries of other threads to detect byte-precise overlaps and detect potential multiprocessor (MP) coherency violations. The load queue compares and store queue compares leads to overall better performance since false sharing can occur without penalty.

In the state-of-the-art, System z® architecture by IBM® has loads and stores that are strongly ordered in a multiprocessor and multithreaded environment where multiple instructions streams execute concurrently. Accordingly, certain rules about observations of stored data are to be followed. As an example, there may be two instruction streams executing on different CPUs (either different cores or different threads on the same core).

| CPU1 | CPU2 |
|---|---|
| Store B | Load A |
| Store A | Load B |

If CPU2 observes new data on Load A, strong ordering means that CPU2 will also observe the updated value on Store B, since Store B logically occurred before Store A. Not all architectures require such strong ordering, and for example, Power Architecture® does not.

In non-SMT cores, this is often achieved by managing the caches in the system using an ESI (exclusive, shared, invalid) protocol, where each cache line has one of the exclusive, shared, or invalid states for each cache in the system. For example, a processor core can only load from a cache line if it owns the cache line in the shared or exclusive state. A processor core can only store if the cache line is owned exclusive. If a processor core does not own a line in the exclusive state, the processor core fetches it the exclusive state from the nest which will move the cache line into invalid state on all other caches. This processing, along with ensuring that invalidation requests are processed in the right order, ensures that strong ordering between processor cores is maintained. Often a MESI (modified, exclusive, shared, invalid) protocol is used where a 4th state, modified (M) state, is provided. This applies to store-in caches but is not necessary for the disclosure, as embodiments work with or without the modified state.

SMT processors execute 2 or more "threads" in one processor core. It is the goal of the SMT processor to dynamically share the caches and other resources between the threads, but the SMT process has to do so in a way that is consistent with the architectural requirements of running multiple software threads concurrently.

In the state-of-the-art, the exclusive and/or shared bit was managed per thread, i.e., only one thread of an SMT processor core can access a cache line exclusively. If two or multiple threads on the same core want to store and/or load on a cache line, the exclusive/shared state needs to toggle (between the two threads). This can lead to performance degradation. In particular, with false sharing, where the two or more threads access different parts of a cache line, this algorithm may lead to degradation in the state-of-the-art. Even if some architectures track exclusivity per core, these state-of-the-art systems would allow only one thread to have access to a whole cache line at a time. Consequently, this effectively resembles toggling of the cache line ownership but with a slightly different implementation.

In embodiments discussed herein, the SMT processor tracks exclusivity of a cache line per an entire core and allows multiple threads within a processor core to access the cache line concurrently (for both stores and loads). Each processor core is configured to execute Load Queue and Store Queue compares for each executed load instruction and store instruction against stores and loads of the other threads to detect byte-precise overlaps, detect potential MP coherency violations, and flush the pipeline when such situations occur.

FIG. 1A depicts an example of an SMT multicore environment according to an embodiment. FIG. 1A shows many SMT processor cores 112A through 112N (generally referred to as SMT processor cores 112) on one SMT processor die or SMT processor 100. The SMT processor cores 112 are connected with an interconnect 122, which may be under the management of an interconnect control (not shown). Each SMT processor core 112 may have an instruction cache for caching instructions from memory to be executed and a data cache for caching data (operands) of memory locations to be operated on by the core 112. In an implementation, caches of multiple dies 100 are interconnected to support cache coherency between the caches of the multiple dies 100. In one implementation, the core 112 caches may be one level of caching in a hierarchical cache structure. For example, each die or SMT processor 100 may employ a shared cache 128 to be shared among all the processor cores 112 on the processor die or processor 100. Additionally, each processor core 112 has its own L1 cache 124 directly on the core 112, and the L1 cache 124 is not shared among the different cores 112 but is a core-internal cache. Also, each processor core 112 may have one or more registers 130 for storing small amounts of data.

It is understood that the processor cores 112 are physical devices that include all the circuitry (i.e., hardware along with firmware) necessary to execute instructions as understood by one skilled in the art.

Although the processor die or processor 100 may include multiple processor cores 112, various examples may be provided with reference to processor core 112A for ease of understanding and not limitation. It is understood that the further details shown and discussed in processor core 112A apply by analogy to all processor cores 112, and these details may be included in all of the processor cores 112.

The processor core 112A is shown with three threads 10A, 10B, and 10C generally referred to as threads 10), and each thread 10A, 10B, and 10C has its own load queue 20A, 20B, and 20C (generally referred to as load queues 20) and its own store queue 25A, 25B, and 25C (generally referred to as store queues 25). The load queues 20 and store queues 25 are memory structures in hardware for storing data, and the memory structures may include erasable programmable read-only memory (EPROM or Flash memory), static random access memory (SRAM), dynamic random access memory (DRAM), etc.

A thread refers to a single instruction stream. At an architecture level, each thread may represent an independent central processing unit (CPU). Instructions which the thread 10 has for execution by the processor core 112 can include a number of instruction classes, such as: general, decimal, floating-point-support (FPS), binary-floating-point (BFP), decimal-floating-point (DFP), hexadecimal-floating-point (HFP), control, and I/O instructions. The general instructions can be used in performing binary-integer arithmetic operations and logical, branching, and other non-arithmetic operations. The decimal instructions operate on data in decimal format. The BFP, DFP, and HFP instructions operate on data in BFP, DFP, and HFP formats, respectively, while the FPS instructions operate on floating-point data independent of the format or convert from one format to another.

On the core 112, each thread 10 has its own corresponding load queue 20 and store queue 25 which are assigned to and associated with a particular thread. For example, thread 10A of core 112A exclusively owns load queue 20A and store queue 25A, thread 10B of core 112A exclusively owns load queue 20B and store queue 25B, and thread 10C of core 112A exclusively owns load queue 20C and store queue 25C. In one implementation, the load queues 20 may be pooled together but each thread 10A, 10B, 10C is delineated or sectioned off. Likewise, the store queues 25 may be pooled together but each thread 10A, 10B, 10C is delineated or sectioned off.

When a load instruction of thread 10A is being executed on the processor core 112A, the load instruction of thread 10A stores a load entry in the load queue 20A. This load entry corresponds to the particular load instruction executing on the processor core 112A. A load instruction is to read data from the L1 cache 124. When a store instruction of thread 10A is executing on the processor core 112A, the store instruction of thread 10A stores a store entry in the store queue 25A. The store instruction is to take data (e.g., a value) from any memory location such as the register 130 and typically some operand has been performed and/or is performed on the data (e.g., to change the value); then the store instruction stores the data (in which the value may or may not be changed) from the register 130 into the L1 cache 124. Additionally and/or alternatively, the store instruction may store the data into the shared cache 128 and main memory 126. Furthermore, a store instruction stores whatever its operands data was, such as the contents of the register 130, or the result of an arithmetic operation between registers/storage operands/immediate constants.

Analogously, when load instructions of thread 10B are being executed on processor core 112A, load instructions of thread 10B store their load entries into load queue 20B. When store instructions of thread 10B are being executed on processor core 112A, the store instructions of thread 10B store their store entries into store queue 25B. Likewise, when load instructions of thread 10C are being executed on processor core 112A, the load instructions of thread 10C store their load entries into load queue 20C. When store instructions of thread 10C are being executed on processor core 112A, the store instructions of thread 10C store their store entries into store queue 25C.

A processor may employ load queues and store queues. Every load or store instruction writes an entry into the respective queue. For managing Load-hit-store and Store-hit-load scenarios, each Load and Store searches the Store-Queue and Load-Queue for older/younger stores/loads. When a Store finds a younger load in the load queue, the store causes a Store Hit Load pipeline flush. When a Load finds an older Store in the Store Queue, the load causes a reject and repeat until the store has written back to the cache. In a multithreaded core, each thread has its own load/store queue (they can be physically shared pools, but effectively each thread searches its own entries for LHS/SHL detection).

According to an embodiment, FIG. 1B illustrates that L1 cache 124 has 0-N cache lines. For ease of understanding, various examples may reference cache line 5 but it is understood that the examples apply by analogy to other cache lines. Also, embodiments can apply to the shared cache 128, but in such a case, a single core 112 (such as processor core 112A) is given exclusive control over a cache line of the shared cache 124. Data transferred between memory 126 and the cache 124 (usually via shared cache 128) in blocks of fixed size is called a cache line. There are different sizes utilized for a cache line, such as 32 bytes, 64 bytes, 128 bytes, etc.

Since the L1 cache 124 is internal to the SMT core 112A, the SMT core 112A has exclusive control over the cache line 5 of the cache 124, and this means that the threads 10A, 10B, 10C together have exclusive control over the cache line 5. In the case using the shared cache 128, assume that the SMT core 112A has exclusive control over the cache line 5 of the cache 128, and this means that the threads 10A, 10B, 10C together have exclusive control over the cache line 5. As such, other SMT cores on the processor 100, such SMT cores 112B through 112N (and their respective threads), cannot access and/or control (cannot read and write) the cache line 5 until exclusive control is released by the SMT processor core 112A of shared cache 128. Once exclusive control is released by the SMT processor core 112A, another SMT processor core can gain exclusive control over the cache line 5 in the case of the shared cache 128.

The following description applies to the L1 cache 124 and/or the shared cache 128 (given that the SMT processor 112A owns the cache line 5 exclusively). The SMT processor core 112A employs load queues 20A through 20C and store queues 25A through 25C. Each time one of the threads 10A through 10C executes a load instruction (e.g., reading the cache line 5 of shared cache 124), the particular thread 10A-10C writes an entry into the its respective load queue 20A-20C. Each time one of the threads 10A through 10C executes a store instruction (e.g., writing to cache line 5), the particular thread 10A-10C writes an entry into its respective store queue 25A-25C.

Note that the term load may be utilized interchangeably for load instruction (of a thread), and the term store may be utilized interchangeably for store instruction (of a thread). For managing load-hit-store and store-hit-load scenarios, each load for a thread 10 in processor core 112A searches the load queues 20 of other threads in the SMT core 112A (but not threads on cores 112B-112N) and each store for a thread 10 in core 112A searches the load queues of the other threads in the SMT core 112A (but not threads on cores 112B-112N). FIGS. 1C and 1D illustrate example entries in the load queues 20A-20C and store queues 25A-25C with respect to the L1 cache 124 and/or during the time at which the SMT core 112A has exclusive control (e.g. reading and writing) of the cache line 5 of the shared cache 128. For the case of the shared cache 128, the SMT core 112A may have exclusive control over other cache lines, and the other SMT cores 112B-112N may have exclusive control over different cache lines (but not cache line 5 during this time).

According to embodiments, loads and stores are processed (by, e.g., SMT core 112A) as follows, besides their normal processing for within-thread load/store conflict detection as described above.

1) Cache ownership is tracked per core, not per thread. So if a core owns a cache line exclusive (e.g., such as cache line 5), all threads own the line exclusive. There is no cache ownership tracking for individual threads.

2) Every store searches the load queue of the other threads on the same SMT core. If the store compares (matches at least one memory address byte) against a pending load on any byte, the other thread is flushed from the pipeline and restarts.

3) Every load searches the store queue of the other threads on the same SMT core. If the load compares (matches at least one memory address byte) against a pending store on any byte, the load is rejected and retried. The load continues to be rejected until the (matched) store is completed and has written back to the cache.

Note that false sharing, where, e.g. the load accesses bytes 0-7 of a cache line, and the store accesses bytes 8-15, do not cause any performance degradation in embodiments since the load queue compares and the store queue compares are byte-precise comparisons. Assume that thread 10A performs a load from byte 0-7, and then thread 10B performs a store to bytes 8-15. The compare (i.e., when the store searches the load queue of the other threads on the same SMT core and if the store (of thread 10B) compares (i.e., matches at least one memory address byte) of the load (for thread 10A) on any byte, the thread 10A is flushed from the pipeline and restarts) would cause a pipeline flush for thread 10A when the store compares (i.e., matches). A pipeline flush is a significant performance penalty: the load and later instructions that have at least partially executed are thrown away, and execution has to start back at instruction fetch again, meaning many processor cycles work is lost. However, in this example according to embodiments, the store does not compare (i.e., does not match), because the memory address bytes of the store do not match in any memory address bytes of the load: the load was to 0-7 bytes while the store is to 8-15 bytes, so there is no overlap when doing a byte precise check.

The alternative in the state-of-the art would be to compare only on cache line granularity, and in this example, both the load and the store target the same cache line 5 (even though different places within the cache line). Accordingly, when the compare is not byte precise but only on a cache line boundary, that would be the case when store compares (i.e., the store matches) and a pipeline flush occurs. However, embodiments consider this "false sharing" because the load and store share the same cache line but do not share the same bytes within the cache line (and no problem is caused).

Also note that there is no limitation of running many stores to the same cache line (e.g., cache line 5) and/or the same bytes (e.g., same bytes 0-7 of the cache line 5) concurrently. There is also no restriction for how loads can overlap. The constraint is only for loads versus store byte-wise overlapping, which is required architecturally. Note that System z® has some instructions that perform multiple loads and/or multiple stores. The above actions are performed for each load component and store component of the instruction. Note that load instructions and store instructions are pending until they are removed from the load queue and store queue, respectively.

Now, referring back to FIG. 1C, example scenarios are provided for the load and store queues on the same cache line for the same SMT core 112A. Assume that the shared cache 124 has 32 byte cache lines, and the SMT core 112A has exclusive control over the cache line 5. Accordingly, the SMT core 112A has been writing entries in the respective load queues 20A-2C and store queues 25A-25C when respective threads execute load and store instructions for the cache line 5.

When the SMT core 112A executes a store instruction 01 for thread 10A on the memory address corresponding to start memory address byte 0 through ending memory address byte 7 of the cache line 5, the store instruction 01 compares (byte per byte) its memory address bytes 0-7 to the start and ending memory addresses in load queues 20B and 20C for threads 10B and 10C respectively. The store instruction 01 for thread 10A searches the load queue 20B (of thread 10B) and finds that at least one byte (or more) in the memory address bytes for load instruction 02 matches at least byte (one or more) in the memory address bytes for store instruction 01. In this particular comparison by the store instruction 01 against load instruction 02, all bytes of the memory address for bytes 0 through 7 match. Accordingly, the store instruction 01 causes the thread 10B (load instruction 02) to be flushed from the pipeline and restarted. Even if only one byte matched, such as the memory address byte location of byte 7 for store instruction 01 matches the memory address byte location of byte 7 for load instruction 02 (but no other memory address bytes matched), the store instruction 01 still recognizes the match of a single memory byte and the thread 10B is flushed from the pipeline and restarted.

Likewise, the store instruction 01 for thread 10A searches the load queue 20C (of thread 10C) and finds that not one byte in the memory address bytes for load instruction 03 matches any of the memory address bytes for store instruction 01. In this comparison by the store instruction 01 against load instruction 03, the memory address bytes 0-7 of the store instruction 01 has no overlap with the memory address bytes 24-33 of the load instruction 03. Accordingly, the load instruction 03 is not flushed.

Now consider when the SMT core 112A executes load instruction 04 for thread 10A on the memory address corresponding to start memory address byte 16 through ending memory address byte 23 of the cache line 5, the load instruction 04 compares (byte per byte) its memory address bytes 16-23 to the start and ending memory addresses in store queues 25B and 25C for threads 10B and 10C respectively. The load instruction 04 for thread 10A searches the store queue 25B (of thread 10B) and finds that at least one byte (or more) in the memory address location for store instruction 05 matches at least byte (one or more) in the memory address bytes for load instruction 04. In this comparison by the load instruction 04 against store instruction 05, all bytes of the memory address bytes 16 through 23 match. Accordingly, the load instruction 04 is rejected and retried. The load instruction 04 is continuously rejected until the store instruction 05 (for thread 10B) is completed and has written back to the cache 124. Even if only one byte matched, such as the memory address byte 16 for load instruction 04 matches the memory address byte 16 for store instruction 05, the load instruction 04 still recognizes the match of a single byte memory address location and the load instruction 04 is rejected and retried. In this case, the load instruction 04 does not need to search the store queue 25C of thread 10C because a match was found in store queue 25B, and the match causes the load instruction 04 to be rejected and repeated.

However, assume that the load instruction 04 has not found a match and is not rejected. Now, the load instruction 04 compares (byte per byte) its memory address bytes 16-23 to the start through ending memory address store queue 25C of thread 10C. The load instruction 04 for thread 10A searches the store queue 25C and finds that no bytes in the memory address bytes 0-7 for store instruction 06 match the memory address bytes 16-23 load instruction 04. In this comparison by the load instruction 04 against store instruction 06, each byte is for a different memory address on the cache line 5 and the load instruction 04 continues processing (reading).

Referring to FIG. 1D, when the SMT core 112A executes the load instruction 13 (load queue 20C) for thread 10C on the memory address corresponding to start memory address byte 24 through ending memory address byte 33 of the cache line 5, the load instruction 13 compares (byte per byte) its memory address bytes 24-33 to the start and ending memory addresses in store queues 25A and 25B for threads 10A and 10B respectively. The load instruction 13 for thread 10C searches the store queue 25A and finds no match of any byte in the memory address bytes for store instruction 14. In this comparison by the load instruction 03 against store instruction 14, there is no overlap in any bytes in the memory address bytes 24-33 of load instruction 13 and the memory address bytes 0-7 of store instruction 14. Accordingly, the load instruction 13 is not rejected by the store instruction 14.

Likewise, the load instruction 13 for thread 10C searches the store queue 25B and finds that not one byte in the memory address bytes for load instruction 13 matches any of the memory address bytes for store instruction 15 in FIG. 1D. In this comparison by the load instruction 13 against store instruction 15, the memory address for bytes 24-33 of the load instruction 03 has no overlap with the memory address of bytes 16-23 of the store instruction 03. Accordingly, the load instruction 13 is not rejected.

Further, the overlap of start and ending memory address bytes 0-7 in both store instruction 14 and store instruction 06 (in FIG. 1D) does not prevent storing in the cache line 5, given that both threads 10A and 10C are on the same SMT core 112A. If the threads were on different SMT cores, this would be a violation of the rules.

Each load instruction with an entry in load queues 20 and each store instruction with an entry in store queues 25 is pending. When the load instruction is completed, then the load instruction entry is removed from the respective load queue 20. When the store instruction is completed, then the store instruction entry is removed from the respective store queue 25. In one case, the store instruction is considered complete when the store instruction has performed its operands and has written back into the L1 cache 124; accordingly, the store queue entry is removed from the store queue 25. In a pipelined core, instruction execution is split into many steps. Instruction completion happens when all steps have successfully finished. These steps include, e.g., decode, issue, generating operand addresses, fetching data, actual execution (arithmetic), generating store data, and/or eventually completion/retirement (freeing resources associated with the instruction). There may be a case in which store instructions can actually execute the steps above in the pipeline without updating the level 1 cache. In that case, the store data is still sitting in the pipeline and has to be written back into the L1 cache 124 eventually (for other instructions to be able to fetch it) to be complete.

The load instruction is considered complete when the load instruction loads the read data from the L1 cache 124 into the register 130.

For ease of understanding, the start memory address and ending memory address are given in example byte address values/positions, and it is understood that the start and ending memory address may be provided in hexadecimal address values as understood by one skilled in the art.

FIG. 3 illustrates a flow chart 300 for simultaneously processing store instructions of threads in a single processor core (e.g., SMT processor core 112A) according to an embodiment.

The processor core 112A comprises circuitry to execute threads 10A, 10B, and 10C by simultaneously multithreading (SMT), where each of the threads 10 has its own load queue 20 and store queue 25. The SMT processor 100 includes the processor cores 112A-112N, the L1 cache 124, and the shared cache 128. The discussion in FIG. 3 can apply to the L1 cache 124 and the shared cache 128.

In response to performing a store instruction for a given thread (e.g., thread 10A) of the threads (e.g., threads 10A-10C), on the processor core 112A and in response to the processor core 112A having ownership of a cache line (e.g., cache line 5) in the cache (e.g., cache 124, 128), the processor core 112A is configured to execute the store instruction at block 305.

The processor core 112A is configured to place/store an entry of the store instruction in a given store queue (e.g., store queue 25A) belonging to the given thread (thread 10A), where the entry for the store instruction has a starting memory address and an ending memory address located on the cache line at block 310.

The processor core 112A is configured to (individually) compare starting memory addresses through ending memory addresses of the load queues 20B and 20C of the threads 10B and 10C on a byte-per-byte basis against the starting memory address through the ending memory address of the store instruction at block 315.

In response to at least one memory address byte in the starting through ending memory addresses in the load queues 20B, 20C of the threads 10B, 10C overlapping with a memory address byte in the starting through ending memory address of the store instruction, the processor core 112A is configured to flush one or more of the threads having the at least one memory address byte at block 320.

In response to no overlap between the memory address bytes of the store instruction with the memory address bytes in the starting through ending memory addresses, the processor core 112A is configured to allow entries in the load queues 20B, 20C of the first threads 10B, 10C, to remain at block 325. In other words, the load instructions in the load queues 20B and 20C can continue processing their read requests of their respective memory locations on the cache line 5.

In response to the processor core 112A owning the cache line 5 of the cache 124, each of the threads 10A-10C simultaneously has exclusive ownership of the cache line 5.

The other processor cores 112B-112N each comprise circuitry to execute their other respective threads by simultaneously multithreading (SMT), and each of the respective threads has its own load queue and store queue (just as processor core 112A). The other processor cores 112B-112N having the other respective threads cannot own the cache line 5 (in the case of the shared cache 128) while the processor core 112A having the threads 10A-10C owns (i.e., controls reading and writing to) the cache line 5.

Comparing the starting memory addresses through the ending memory addresses of the load queues 20B, 20C of the threads 10A, 10B on the byte-per-byte basis against the starting memory address through the ending memory address of the store instruction of thread 10A comprises individually checking each memory address byte in the starting memory addresses through the ending memory addresses of the load queues 20B, 20C against (each memory address bytes in) the starting memory address through the ending memory address of the store instruction in order to find matching memory address bytes. Only one matching memory address byte is needed to determine overlap.

The entries in the load queues 20A-20C correspond to load instructions.

The starting memory address through the ending memory address of the store instruction (for thread 10A) is permitted to overlap, with respect to the cache line 5, with other store instructions of the threads 10B and 10C.

The starting through the ending memory address of the store instruction (for thread 10A) is permitted to have memory address bytes adjacent to (but without overlapping on the cache line 5) memory address bytes of a load instruction of the threads 10B, 10C. For example, the starting through memory address of the store instruction can be memory address bytes 0-7 and the memory address bits of a load instruction (for thread 10B, 10C) can be memory address bytes 8-33; having adjacent memory address bytes is permitted because without a problem because there is no overlap between the memory address bytes of the store instruction and load instruction.

FIG. 4 illustrates a flow chart 400 for simultaneously processing load instructions of threads in a single processor core (e.g., SMT processor core 112A) according to an embodiment.

The processor core 112A comprises circuitry to execute threads 10A, 10B, and 10C by simultaneously multithreading (SMT), where each of the threads 10 has its own load queue 20 and store queue 25. The SMT processor 100 includes the processor cores 112A-112N, the L1 cache 124, and the shared cache 128. The discussion in FIG. 4 can apply to the L1 cache 124 and the shared cache 128.

In response to performing a load instruction for a given thread (e.g., thread 10A) of the threads 10A, 10B, 10C on the processor core 112A and in response to the processor core 112A having ownership of the cache line 5 in the cache (e.g., cache 124, 128), the processor core 112A is configured to execute the load instruction at block 405.

At block 410, the processor core 112A is configured to place an entry of the load instruction in a given load queue (e.g., load queue 20A) belonging to the given thread (e.g., thread 10A), and the entry for the load instruction has a starting memory address and an ending memory address on the cache line 5.

The processor core 112A is configured to compare starting memory addresses through ending memory addresses of the store queues (e.g., store queues 25B and 25C) of the threads (e.g., threads 10B and 10C) on a byte-per-byte basis against the starting memory address through the ending memory address of the load instruction at block 415.

In response to at least one memory address byte in the starting through ending memory addresses in the store queues of the threads (e.g., threads 10B and 10C) overlapping with a memory address byte in the starting through ending memory address of the load instruction, the processor core 112A is configured to reject the load instruction (of thread 10A) and subsequently repeat the load instruction at block 420.

At block 425, in response to no overlap in any memory address byte (in the starting through ending memory of the threads 10B and 10C versus the starting through ending memory address of the load instruction of thread 10A), the processor core 112A is configured to allowing the load instruction (of thread 10A) to process. For example, the load instruction continues its read operation of the specified memory address.

In response to the processor core 112A owning the cache line 5 of the cache 124 exclusively, each of the threads 10A-10C has ownership of the cache line 5.

The other processor cores 112B-112N comprise circuitry to execute other threads by simultaneously multithreading (SMT), and each of the other threads has its own load queue and store queue. The other processor cores 112B-112N having the other threads cannot own the cache line 5 in the case of the shared cache 128 while the processor core 112A having the threads owns the cache line 5 of the shared cache 128. Note that requiring a processor core 112 to own the cache line 5 exclusively does not apply for the L1 cache 124 because the L1 cache 124 is internal to a core 112 and the core 112 inherently owns its own internal L1 cache. Purely considering loads, it is not necessary to own the line exclusively. Owning the cache line exclusively applies only to stores. For example, for loads, it is possible for, e.g., core 112A and core 112B to access the same cache line, and thereby have load queue entries (even overlapping load queue entries) for the same cache line. That changes as soon as a store to the same cache line comes into play. The word "own" is used the same way for the store queue section and the load queue section, but as soon as the relationship to core 112B-N is relevant, there is a difference between owning lines that a core stores to (ownership has to be exclusive to that core, but still shared between all the threads on that core) and a line that the core does not store to (ownership can be shared with other cores, and by that also with all threads on all other cores).

Comparing the starting memory addresses through the ending memory addresses of the store queues 25B, 25C of the threads 10B, 10C on the byte-per-byte basis against the starting memory address through the ending memory address of the load instruction comprises checking each memory address byte in the starting memory addresses through the ending memory addresses of the store queues 25B and 25C against the starting memory address through the ending memory address of the load instruction (thread 10A) in order to find matching memory address bytes.

The entries in the store queues 25B and 25C correspond to store instructions of the threads 10B and 10C.

The starting memory address through the ending memory address of the load instruction (of thread 10A) is permitted to overlap, on the cache line 5, with other load instructions of the threads 10B and 10C. The starting through the ending memory address of the load instruction (of thread 10A) is permitted to have memory address bytes adjacent to, but without overlapping on the cache line 5, memory address bytes of a store instruction of the threads 10B and 10C.

Note that the load instructions and store instruction are processed simultaneously in each of the SMT processor cores 112A-112N for their respective threads.

Figure 2:
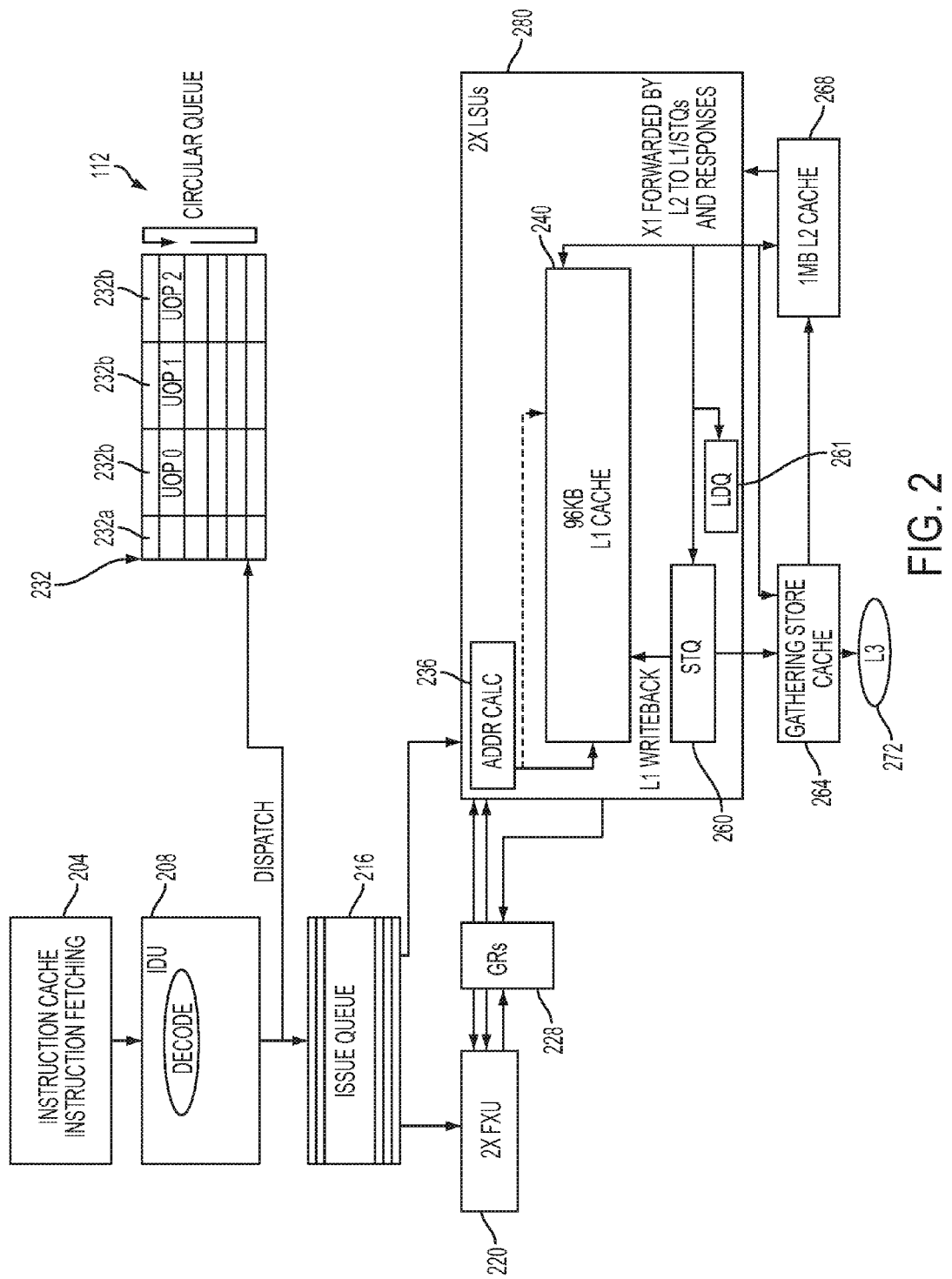
FIG. 2 depicts an example of a processor core in accordance with an embodiment.

One skilled in the art understands the circuitry in a processor having processor cores. FIG. 2 illustrates an example of a processor core 112 that can be utilized with embodiments. The instruction fetching unit 204 fetches instruction from memory. The instructions are then sent to the instruction decode unit (IDU) 208. The processor core can decode 3 instructions per clock cycle; simple instructions are dispatched as single micro-ops, and more complex instructions are cracked into multiple micro-ops. The micro-ops (Uops 232b) are written into a unified issue queue 216, from where they can be issued out-of-order. Up to two fixed-point, one floating-point, two load/store, and two branch instructions can execute every cycle. A Global Completion Table (GCT) 232 holds every micro-op. The GCT 232 is written in-order at decode time, tracks the execution status of each micro-op 232b, and completes instructions when all micro-ops 232b of the oldest instruction group have successfully executed. Instruction execution is done in the execution units, shown are two fixed point units (FXU) 220 used to handle fixed point operations and two load/store units (LSU) 280 used to handle loads and stores. Both have access to registers (GRs) 228 that can provide input data for fixed point operations to FXU 220 or to the address generation 236 for memory access. The registers 228 can also be the destination of data generated by the fixed point units 220 or loads executed in the LSUs 280. FIG. 2 also shows a store queue (STQ) 260 and a load queue (LDQ) 261 as described before. For example, the store queues (STQ) 260 and load queues (LDQ) 261 in FIG. 2 handle loads and stores such as described for store queues 25A, 25B, 25C and load queues 20A, 20B, 20C in FIG. 1.

The level 1 (L1) data cache 240 is a 96 KB (kilo-byte) 6-way associative cache with 256 byte cache-lines and 4 cycle use latency, coupled to a private 1 MB (mega-byte) 8-way associative 2nd-level (L2) data cache 268 with 7 cycles use-latency penalty for L1 240 misses. L1 240 cache is the cache closest to a processor and Ln cache is a cache at the nth level of caching. Both L1 240 and L2 268 caches are store-through. Six cores on each central processor (CP) chip share a 48 MB 3rd-level store-in cache, and six CP chips are connected to an off-chip 384 MB 4th-level cache, packaged together on a glass ceramic multi-chip module (MCM). Up to 4 multi-chip modules (MCMs) can be connected to a coherent symmetric multi-processor (SMP) system with up to 144 cores (not all cores are available to run customer workload).

Coherency is managed with a variant of the MESI protocol. Cache-lines can be owned read-only (shared) or exclusive; the L1 240 and L2 268 are store-through and thus do not contain dirty lines. The L3 272 and L4 caches (not shown) are store-in and track dirty states. Each cache is inclusive of all its connected lower level caches.

Coherency requests are called "cross interrogates" (XI) and are sent hierarchically from higher level to lower-level caches, and between the L4s. When one core misses the L1 240 and L2 268 and requests the cache line from its local L3 272, the L3 272 checks whether it owns the line, and if necessary sends an XI to the currently owning L2 268/L1 240 under that L3 272 to ensure coherency, before it returns the cache line to the requestor. If the request also misses the L3 272, the L3 272 sends a request to the L4 (not shown), which enforces coherency by sending XIs to all necessary L3s under that L4, and to the neighboring L4s. Then the L4 responds to the requesting L3 which forwards the response to the L2 268/L1 240.

Note that due to the inclusivity rule of the cache hierarchy, sometimes cache lines are XI'ed from lower-level caches due to evictions on higher-level caches caused by associativity overflows from requests to other cache lines. These XIs can be called "LRU XIs", where LRU stands for least recently used.

Making reference to yet another type of XI requests, Demote-XIs transition cache-ownership from exclusive into read-only state, and Exclusive-XIs transition cache ownership from exclusive into invalid state. Demote-XIs and Exclusive-XIs need a response back to the XI sender. The target cache can "accept" the XI, or send a "reject" response if it first needs to evict dirty data before accepting the XI. The L1 240/L2 268 caches are store through, but may reject demote-XIs and exclusive XIs if they have stores in their store queues that need to be sent to L3 before downgrading the exclusive state. A rejected XI will be repeated by the sender. Read-only-XIs are sent to caches that own the line read-only; no response is needed for such XIs since they cannot be rejected. The details of the SMP protocol are similar to those described for the IBM z10 by P. Mak, C. Walters, and G. Strait, in "IBM System z10 processor cache subsystem microarchitecture", IBM Journal of Research and Development, Vol 53:1, 2009, which is incorporated by reference herein in its entirety.

Figure 5:
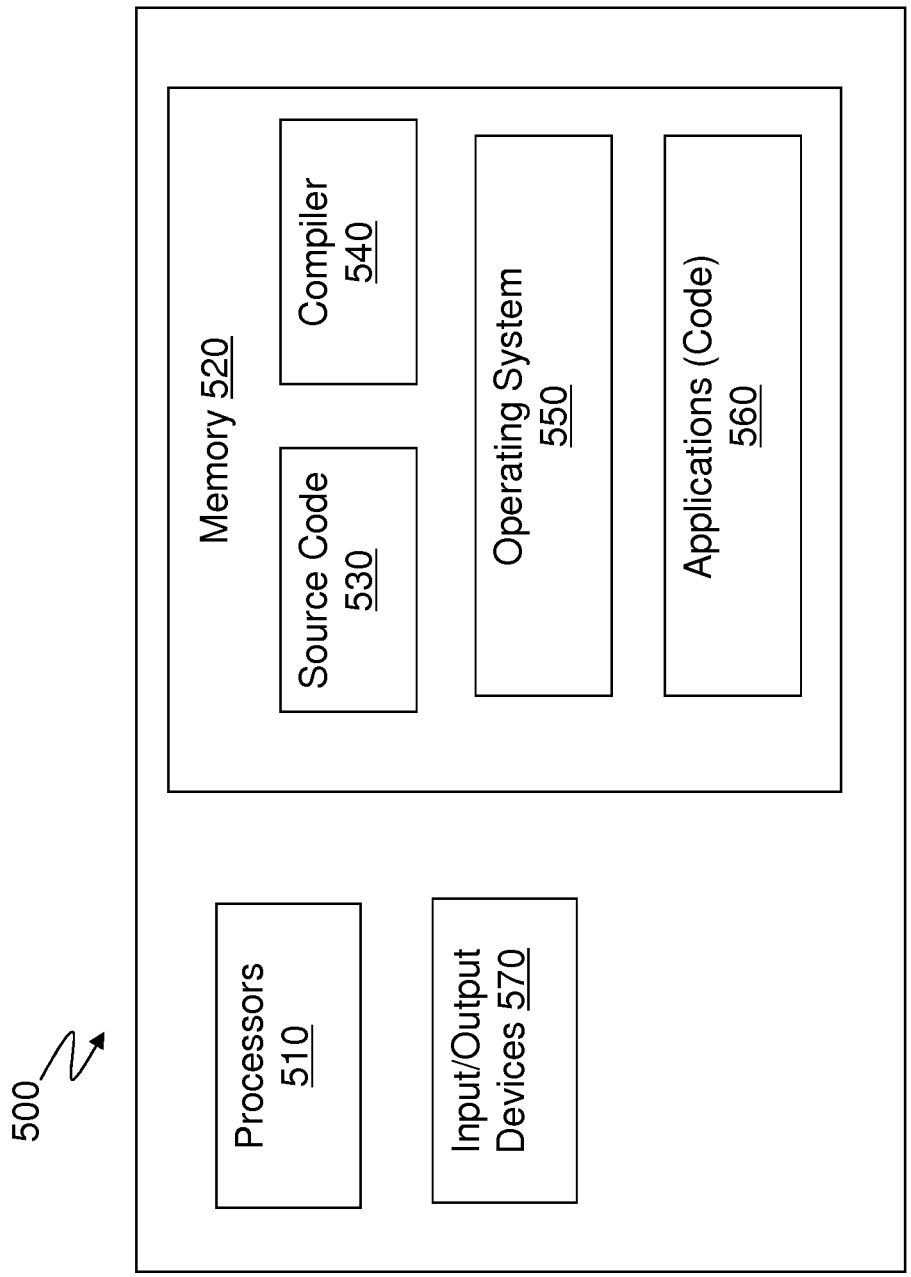
FIG. 5 depicts an example computer that can implement features discussed herein.

FIG. 5 illustrates an example computer (e.g., which includes the various SMT cores (circuits) 112A-112N of the SMT processor 100 as discussed herein) that can implement features discussed herein. The computer 500 may be a distributed computer system over more than one computer. Various methods, procedures, modules, flow diagrams, tools, applications, circuits, elements, and techniques discussed herein may also incorporate and/or utilize the capabilities of the computer 500. Indeed, capabilities of the computer 500 may be utilized to implement and execute features of exemplary embodiments discussed herein.

Generally, in terms of hardware architecture, the computer 500 may include one or more processors 510 (i.e., SMT processor 100 with SMT cores 112A-112N), computer readable storage memory 520, and one or more input and/or output (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a macroprocessor.

The computer readable memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Note that the memory 520 can have a distributed architecture, where various components are situated remote from one another, but can be accessed by the processor(s) 510.

The software in the computer readable memory 520 may include one or more separate programs, each of which comprises an ordered listing of executable instructions for implementing logical functions. The software in the memory 520 includes a suitable operating system (O/S) 550, compiler 540, source code 530, and one or more applications 560 of the exemplary embodiments. As illustrated, the application 560 comprises numerous functional components for implementing the features, processes, methods, functions, and operations of the exemplary embodiments.

The operating system 550 may control the execution of other computer programs, and provides scheduling, input-output control, file and data management, memory management, and communication control and related services.

The software application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as (a) an object oriented programming language, which has classes of data and methods, or (b) a procedure programming language, which has routines, subroutines, and/or functions.

The I/O devices 570 may include input devices (or peripherals) such as, for example but not limited to, a mouse, keyboard, scanner, microphone, camera, etc. Furthermore, the I/O devices 550 may also include output devices (or peripherals), for example but not limited to, a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or an intranet. The I/O devices 570 may be connected to and/or communicate with the processor 510 utilizing Bluetooth connections and cables (via, e.g., Universal Serial Bus (USB) ports, serial ports, parallel ports, FireWire, HDMI (High-Definition Multimedia Interface), etc.).

Technical effects and benefits include the capability of tracking exclusivity of a cache line per an entire core, and allowing multiple threads within a core to access the cache line concurrently. The processor core utilizes load queue and store queue compares for each executed load instruction and store instruction against the other threads stores and loads to detect byte-precise overlaps.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for simultaneous multithreading (SMT), the system comprising:
   a shared cache;
   a processor core comprising circuitry configured to execute threads by SMT, the threads including a first thread, a second thread, and a third thread, each of the first, second, and third threads having its own load queue and store queue such that the first thread has a first load queue and a first store queue, the second thread has a second load queue and a second store queue, and the third thread has a third load queue and a third store queue, the processor comprising an instruction cache, wherein in response to the processor core having control for writing and reading of a cache line in the shared cache, the processor core is configured to execute a store instruction for the first thread of the threads on the processor core comprising:
   placing an entry of the store instruction in the first store queue belonging to the first thread, the entry for the store instruction having a starting memory address and an ending memory address on the cache line;
   comparing starting memory addresses through ending memory addresses of the second and third load queues of the second and third threads on a byte-per-byte basis against the starting memory address through the ending memory address of the store instruction of the first store queue of the first thread;
   in response to at least one memory address byte in the starting through ending memory addresses in any of the second and third load queues of the second and third threads overlapping with a memory address byte in the starting through ending memory address of the store instruction, flushing the second thread or the third thread having the at least one memory address byte;
   in response to no overlap, permitting entries in the second and third load queues of the threads to remain;
   wherein the second and third threads for the second and third store queues have overlapping memory address bytes in the cache line; and
   storing to the cache line concurrently for both the second and third threads, the storing concurrently being permitted based on the second and third threads being on the processor core together, wherein the second and third threads are not permitted to both store concurrently to the cache line if on separate processor cores;
   an other processor core comprising circuitry to execute other threads by SMT, each of the other threads having its own load queue and store queue, wherein the other processor core having the other threads cannot control writing and reading of the cache line while the processor core having the first, second, and third threads controls writing and reading of the cache line.

2. The system of claim 1, further comprising in response to the processor core controlling writing and reading of the cache line of the cache, writing and reading of the cache line is tracked per core not per thread with respect to cache ownership, thereby allowing each of the first, second, and third threads control writing and reading of the cache line.

3. The system of claim 1, wherein the processor core is configured to execute a load instruction for the first thread comprising:
   placing an entry of the load instruction in the first load queue belonging to the first thread, the entry for the load instruction having another starting memory address and another ending memory address on the cache line;
   comparing particular starting memory addresses through particular ending memory addresses of the second and third store queues on a byte-per-byte basis against the another starting memory address through the another ending memory address of the load instruction of the first load queue;
   in response to at least one memory address byte in the particular starting through ending memory addresses in the second and third store queues of the second and third threads overlapping with a memory address byte in the another starting through ending memory address of the load instruction, rejecting the load instruction and subsequently repeating the load instruction of the first thread;

in response to no overlap in any memory address byte in the particular starting through ending memory addresses versus the another starting through ending memory address of the load instruction of the first thread, allowing the load instruction of the first thread.

4. The system of claim 1, wherein comparing the starting memory addresses through the ending memory addresses of the second and third load queues of the second and third threads on the byte-per-byte basis against the starting memory address through the ending memory address of the store instruction comprises:

individually checking each memory address byte in the starting memory addresses through the ending memory addresses of the second and third load queues against the starting memory address through the ending memory address of the store instruction of the first thread in order to find matching memory address bytes.

5. The system of claim 1, wherein entries in the first, second, and third load queues correspond to load instructions.

6. The system of claim 1, wherein the starting memory address through the ending memory address of the store instruction in the first store queue of the first thread is permitted to overlap, on the cache line, with second and third store instructions of the second and third threads.

7. The system of claim 1, wherein the starting through the ending memory address of the store instruction of the first thread is permitted to have memory address bytes adjacent to, but without overlapping on the cache line, memory address bytes of a load instruction of the second and third threads.

8. A system for simultaneous multithreading (SMT), the system comprising:

a shared cache;

a processor core comprising circuitry configured to execute threads by SMT, the threads including a first thread, a second thread, and a third thread, each of the first, second, and third threads having its own load queue and store queue such that the first thread has a first load queue and a first store queue, the second thread has a second load queue and a second store queue, and the third thread has a third load queue and a third store queue, the processor comprising an instruction cache, wherein in response to the processor core having control for writing and reading of a cache line in the shared cache, the processor core is configured to execute a load instruction for the first thread of the threads on the processor core comprising:

placing an entry of the load instruction in the first load queue belonging to the first thread, the entry for the load instruction having a starting memory address and an ending memory address on the cache line;

comparing starting memory addresses through ending memory addresses of the second and third store queues of the second and third threads on a byte-per-byte basis against the starting memory address through the ending memory address of the load instruction of the first store queue of the first thread;

in response to at least one memory address byte in the starting through ending memory addresses in any of the second and third store queues of the second and third threads overlapping with a memory address byte in the starting through ending memory address of the load instruction, rejecting the load instruction and subsequently repeating the load instruction of the first thread;

in response to no overlap, permitting the load instruction of the first thread to process;

wherein the second and third threads for the second and third store queues have overlapping memory address bytes in the cache line; and storing to the cache line concurrently for both the second and third threads, the storing concurrently being permitted based on the second and third threads being on the processor core together, wherein the second and third threads are not permitted to both store concurrently to the cache line if on separate processor cores;

an other processor core comprising circuitry to execute other threads by SMT, each of the other threads having its own load queue and store queue, wherein the other processor core having the other threads cannot control writing and reading of the cache line while the processor core having the first, second, and third threads controls writing and reading of the cache line.

9. The system of claim 8, wherein comparing the starting memory addresses through the ending memory addresses of the second and third store queues of the threads on the byte-per-byte basis against the starting memory address through the ending memory address of the load instruction comprises:

individually checking each memory address byte in the starting memory addresses through the ending memory addresses of the second and third store queues against the starting memory address through the ending memory address of the load instruction of the first thread in order to find matching memory address bytes.

10. The system of claim 8, wherein entries in the first, second, and third store queues correspond to store instructions.

11. The system of claim 8, wherein the starting memory address through the ending memory address of the load instruction in the first store queue of the first thread is permitted to overlap, on the cache line, with other load instructions of the second and third threads.

12. The system of claim 8, wherein the starting through the ending memory address of the load instruction of the first thread is permitted to have memory address bytes adjacent to, but without overlapping on the cache line, memory address bytes of a store instruction of the second and third threads.

* * * * *